(12) United States Patent
Burd

(10) Patent No.: US 8,418,470 B2
(45) Date of Patent: Apr. 16, 2013

(54) GAS TURBINE COMBUSTOR BULKHEAD PANEL

(75) Inventor: Steven W. Burd, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 2225 days.

(21) Appl. No.: 11/246,842

(22) Filed: Oct. 7, 2005

(65) Prior Publication Data

US 2007/0082530 A1    Apr. 12, 2007

(51) Int. Cl.
 *F23R 3/10* (2006.01)
 *F23R 3/50* (2006.01)

(52) U.S. Cl.
 USPC .............................................. 60/756; 60/752

(58) Field of Classification Search ............ 60/756, 60/752, 737, 748, 747
 See application file for complete search history.

(56) References Cited

U.S. PATENT DOCUMENTS

| 4,763,482 | A  | * | 8/1988  | Wehner ........................... 60/748 |
| 4,934,145 | A  | * | 6/1990  | Zeisser ............................ 60/756 |
| 5,956,955 | A  | * | 9/1999  | Schmid ........................... 60/756 |
| 6,497,105 | B1 | * | 12/2002 | Stastny ............................ 60/796 |
| 6,751,961 | B2 | * | 6/2004  | Pacheco-Tougas et al. .... 60/756 |
| 2006/0042257 | A1 | * | 3/2006  | Stastny ............................ 60/752 |

\* cited by examiner

*Primary Examiner* — Ted Kim
(74) *Attorney, Agent, or Firm* — Carlson, Gaskey & Olds PC

(57) ABSTRACT

A section panel assembly for a bulkhead of a gas turbine combustor includes a section panel defining a rear or cold side and defining a front or hot side. The panel has a circumferential inner edge, a circumferential outer edge and radially extending first and second side edges each extending from the inner edge to the outer edge such that the inner and outer edges subtend a predetermined arc. The panel defines at least one opening extending from the rear side to the front side for receiving cooling air. The rear side includes a central lip extending about a periphery of the opening, and a circumferential rail spaced radially outwardly of and extending about the opening for defining a cavity region including the opening on the rear side of the section panel.

5 Claims, 1 Drawing Sheet

GAS TURBINE COMBUSTOR BULKHEAD PANEL

FIELD OF THE INVENTION

This invention relates generally to combustors for gas turbines, and more particularly to a bulkhead heat shield for use in gas turbines.

BACKGROUND OF THE INVENTION

Gas turbine engines, such as those to power modem commercial aircraft, include a compressor for pressurizing a supply of air, and a turbine for extracting energy from the resultant combustion gases. The combustor typically comprises radially spaced inner and outer liners. The liners, single or double-wall construction, define an annular combustion chamber that resides axially between the compressor and turbine. Arrays of circumferentially distributed combustion air holes penetrate each liner at multiple axial locations to admit combustion air into the combustion chamber. A plurality of circumferentially distributed fuel injectors project into the forward end of the combustion chamber to supply the fuel for combustion.

At one end of the combustor is a bulkhead panel which provide heat shielding to the fore combustor section as is subjected to relatively high temperatures. As a result, it is necessary to provide the bulkhead panel with effective cooling.

Accordingly, it is an object of the present invention to provide an improved bulkhead panel for use in gas turbine engine combustors.

It is a further object of the present invention to provide a bulkhead panel which has an effective cooling scheme associated within and one that inherently supports the insertion of two or more fuel nozzles and guides per panel to the net reduction in part count for a given combustor.

SUMMARY OF THE INVENTION

In one aspect of the present invention, a section panel assembly for a bulkhead of a gas turbine combustor comprises a section panel defining a rear or cold side and defining a front or hot side. The panel has a circumferential inner edge, a circumferential outer edge and radially extending first and second side edges each extending from the inner edge to the outer edge such that the inner and outer edges subtend a predetermined arc. The panel defines at least one opening extending from the rear side to the front side for receiving cooling air. The rear side includes a central lip extending about a periphery of the at least one opening, and a circumferential rail spaced radially outwardly of and extending about the at least one opening for defining a cavity region induding the at least one opening on the rear side of the section panel.

In another aspect of the present invention, a section panel assembly for a bulkhead of a gas turbine combustor comprises a section panel defining a rear or cold side and defining a front or hot side. The panel has a circumferential inner edge, a circumferential outer edge and radially extending first and second side edges each extending from the inner edge to the outer edge such that the inner and outer edges subtend a predetermined arc. The panel defines first and second openings spaced relative to one another along the arc and extending from the rear side to the front side for receiving cooling air. The rear side includes a first central lip extending about a periphery of the first opening, and a second central lip extending about a periphery of the second opening. A first circumferential rail is spaced radially outwardly of and extends about the first opening for defining a cavity region including the first opening on the rear side of the section panel. A second circumferential rail is spaced radially outwardly of and extends about the second opening for defining a cavity region including the second opening on the rear side of the section panel.

BRIEF DESCRIPTION OF THE DRAWINGS

FIG. 1 is a rear view of a bulkhead panel embodying the present invention.

FIG. 2 is a front view of the bulkhead panel of FIG. 1.

DETAILED DESCRIPTION OF THE PREFERRED EMBODIMENT

Referring to FIGS. 1 and 2, a bulkhead section panel embodying the present invention is indicated generally by the reference number 10. The section panel 10 has a rear or cold side 12 as shown in FIG. 1, and a front or hot side 14 as shown in FIG. 2. The panel 10 is a truncated annular section having a periphery including an inner edge 15 having an axially extending arcuate inner lip 16, and an outer edge 17 having an axially extending arcuate outer lip 18 that define an arc of the panel. The periphery of the panel 10 is completed by two radially extending linear side edges 19, 20 each extending between an end of the inner lip 16 and an end of the outer lip 18 such that the section panel 10 subtends a predetermined arc. The panel 10 further comprises two radially extending peripheral rails 21, 22 each spaced slightly inwardly of an associated side edge 19, 20 of the panel. The section panel 10 defines center openings such as a first opening 26 bordered by a first central lip 30, and a second opening 28 bordered by a second central lip 32. The panel 10 also comprises a central rail 24 radially extending between the first and second openings 26, 28 from the inner lip 16 to the outer lip 18.

Each of the openings 26, 28 extends between the front side 14 and the rear side 12 for receiving fuel nozzles and fuel nozzle guides through which cooling air flows. The first and second openings 26, 28 are preferably circular as shown in FIGS. 1 and 2, but are not limited in this regard. As illustrated in FIG. 1, the rear side 12 of the section panel 10 defines a first circumferential rail or rib 34 disposed radially outwardly of and extending about the first opening 26 for defining a first cavity region including the first opening 26 on the rear side 12 of the panel 10, and a second circumferential rail or rib 36 disposed radially outwardly of and extending about the second opening 28 for defining a second cavity region including the second opening 28 on the rear side 12 for the purpose explained below. The section panel 10 further includes a plurality of attachment studs or projections 38 extending from the rear side 12 and located generally about the periphery of the section panel 10 for coupling the section panel to a bulkhead support shell. For example, as shown in FIG. 1, the section panel 10 includes six attachment studs 38. Three attachment studs 38 are spaced from one another along the inner lip 16, and three attachment studs 38 are spaced from one another along the outer lip 18. Preferably, the aforementioned rails are integrally formed with the panel 10, but can be made separately and coupled to the panel without departing from the scope of the present invention.

The panel sections 10 in accordance with the present invention relate to the combustors for gas turbines and in particular to a bulkhead heat shield design and assembly that is advantageous for use in gas turbines.

A combustor (not shown) employing the panels 10 in accordance with the present invention comprises radially spaced inner and outer liners. The liners define an annular combustion chamber. In a preferred embodiment, the liner is a two-wall construction. Impingement cooling holes penetrate through the support shells. Inner and outer heat shield panels line the hot (inner portion of the combustor exposed to the combustion gases) side of the inner and outer liners. Each support shell has two rows of heat shield panels, namely a forward (fore) and aft row.

The combustor also includes a front end assembly comprising an annularly extending hood, a bulkhead assembly, fuel injectors and fuel injector guides. The front end assembly is the vehicle for introducing primary combustion air into the forward end of the combustion chamber.

The hood extends radially between and is secured to the forward most ends of the inner and outer support shells. The hood includes circumferentially distributed hood ports that accommodate fuel injectors and guides that introduce air into the forward end of the combustion chamber.

The bulkhead assembly includes an annularly extending bulkhead support shell secured to the bulkhead. The bulkhead support shell includes circumferentially distributed openings to accommodate the fuel injectors and fuel injector air guides. The bulkhead support shell is preferably constructed of formative metal sheet material. This is because there is preferably a small step or depression that is created close to every opening through which the fuel injection nozzles and the fuel injection nozzle guides are inserted. The fuel injector nozzle guide sits on and has full contact with this depression. The support shell is provided with a plurality of holes that supply impingement cooling air to the back or cold side of the bulkhead panel or heat shield in the vicinity of the depression location.

Cooling air passages or holes perforate other portions of the bulkhead support shell. The holes are perpendicular to the surface of the support shell. The holes allow jets of cooling air to impinge on the back surface of the bulkhead panel 10. The jets of air then flow through holes in the panel 10. The heat transferred out of the panel 10 in this manner is very large in the region where the jets impinge (stagnation point) and it decays as the cooling air flows over the surface of the cold side 12 of the panel until it flows into a panel hole. The impingement holes in the support shell direct air so that it impinges on the panel 10 generally between adjacent holes.

The fuel injector guides each have a central opening circumferentially aligned with one of the hood ports. The fuel injector guides each project through the bulkhead assembly. Purge air passages and swirl air passages may extend through each of the fuel injector guides. A guide air swirler may reside in the upstream end of each swirl passage.

Figure 1:
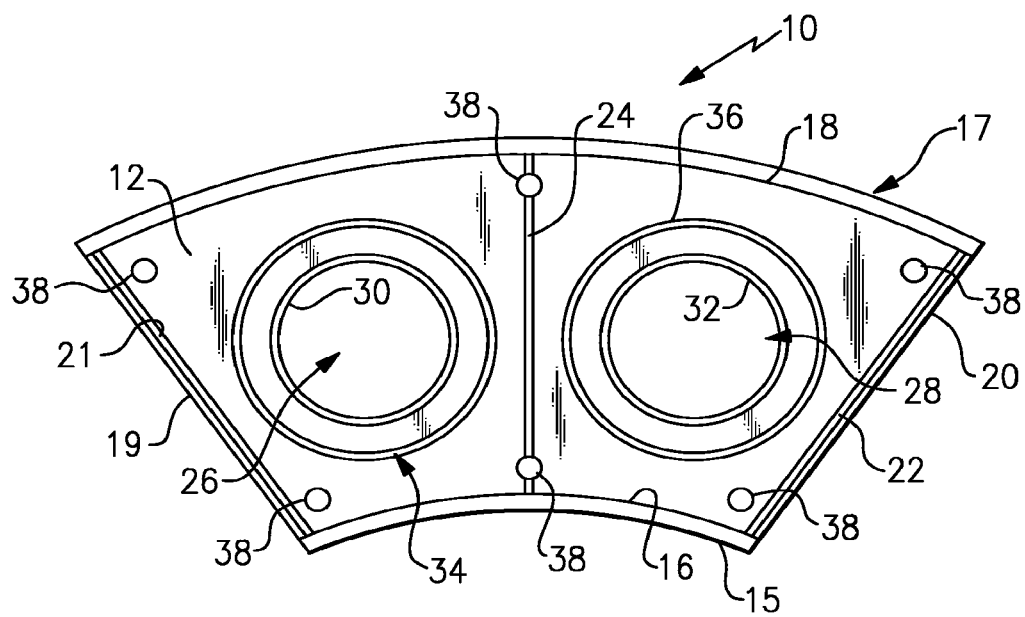
Figure 2:
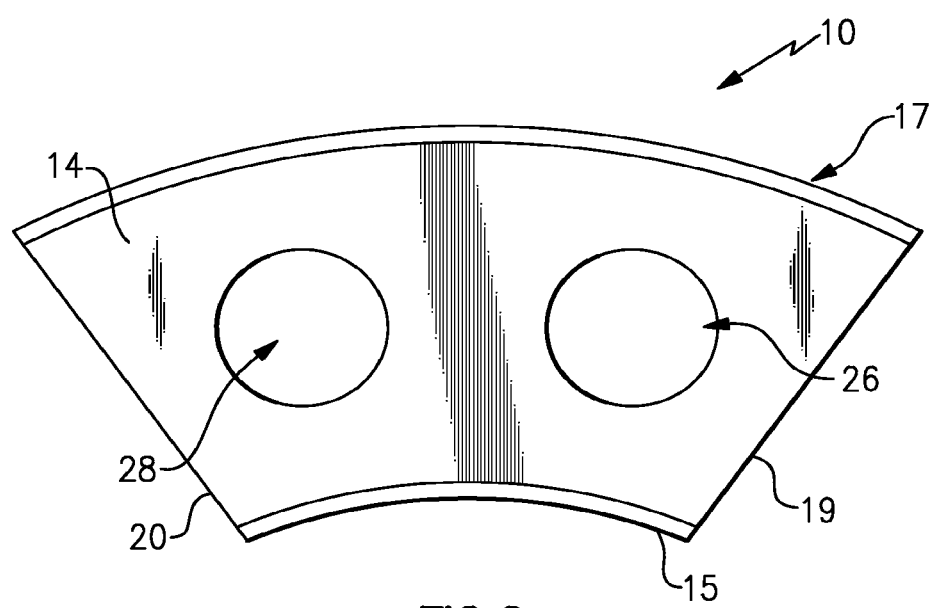

Each bulkhead section panel 10 preferably subtends a predetermined arc as shown in FIGS. 1 and 2. The extent of the arc depends upon the number of panels 10 affixed to the bulkhead support shell. Contrary to current practice, the number of panels 10 is preferably commensurate with half the number of fuel injectors. Thus, the fuel injector and air guides are coupled in a pair to each panel 10. For example, a panel 10 preferably has an arc about 40 degrees for a nine panel, eighteen fuel injector configuration.

Each of the integrally formed peripheral rails 21, 22 of the panel 10 extends radially and contacts the support shell when the panel is affixed thereto. The integrally formed circumferential rails 34, 36 preferably are of the same height as the integrally formed peripheral rails 21, 22. The circumferential rails 34, 36 provide the needed structural support for the section panel 10 and divide the rear or cold side 12 of the panel into distinct pressurized cavity regions through which cooling air is injected. The cavity region has an array of shell holes and an array of panel cooling holes. The panel holes are used to create a film of cooling air over the front or hot side of the panel 10. As mentioned above, each panel 10 can also have a central rail 24 on the cold side 12 radially extending between the two center openings 26, 28 in the panel as well as additional attachment studs 38 in this central region of the panel.

The main advantage of having separate cooling regions in this manner is the maintenance of an optimum air distribution through each panel 10 created by the circumferential rails 34, 36 and the peripheral rails 21, 22. The circumferential rails 34, 36 and the peripheral rails 21, 22 and the panel 10 cause the cavity region to be a sealed chamber when the rails are placed in contact with the support shells. As a result a pressure drop is created which drives cooling air into every panel hole of the panel 10 in such a way that the panel is optimally cooled by convection through the panel holes and the creation of a film flow through the panel holes.

The panel holes pass through the panel 10 at an angle to the panel surfaces. A shallow angle is preferred as it reduces the penetration of the cooling jets into the combustion chamber, assuring better film coverage or attachment to the hot surface. The panel holes are arranged generally as circumferential rows around the opening with a low radial spacing between adjacent rows. The axes of the cooling holes are arranged such that the flow admitted through these holes exits radially with respect to the center of each opening or tangentially with respect to each opening. Other holes are accommodated in patterns not represented by rows to provide local cooling treatments.

Swirler vanes in the fuel injector and in the fuel injector guide cause air exiting these elements to flow in a swirling pattern around the center of each opening of the bulkhead panel 10. In general, the cooling hole orientation is configured in a pattern that optimally interacts with the fuel nozzle-guide swirl pattern.

As mentioned above, the bulkhead panel 10 has integrally formed central lips 30, 32 that respectively form the center openings 26, 28. The lips 30, 32 are longer than the peripheral rails 21, 22 and the circumferential rails 34, 36 and are upon which sit the fuel injector guides. Each of the lips 30, 32 seals the inner cavity region and forms a sealed chamber that is created by the bulkhead support shell, the bulkhead panel 10 and the circumferential rails 34, 36. Sealing of the cavity region in this manner is of utmost importance and is needed to force cooling air to vent through the cooling holes.

The integrally formed and axially extending inner and outer lips 16, 18 respectively disposed on the inner and outer edges 15, 17 define the arc of the panel 10. The purpose of the lips 16, 18 is to help channel the cooling air that exits the cavity formed by the support shells and the fore row of liner segments. This air, which has already extracted heat from the forward liner segments is further utilized as a film for the upstream region of the fore liner segments. Without the lips 16, 18, the cooling air would diffuse into the front end of the combustion chamber and become involved in the combustion process in an undesired fashion.

As detailed, the panel 10 for a bulkhead assembly is constructed to create an effective cooling air film layer that helps to protect the hot side of the bulkhead assembly and adds to the overall life of the combustor. Further, the panel 10 can be easily replaced as needed. The panel 10 can be formed using any suitable technique known in the art or formed of any suitable metallic or non-metallic material or composite material system known in the art.

While the present invention has been described in the context of specific embodiments thereof, other alternatives, modifications and variations will become apparent and can be made without departing from the scope of the present invention.

For example, the peripheral rails can be configured to permit a gap between the rails and shell or be segmented to allow cooling flow to migrate around the edges of the panels. In this arrangement, the panel is held to the shell via standoffs in the vicinity of the attachments and with surface contact about the circumferential rails.

Alternatively, the bulkhead panels need not include the lips which form the inner and outer arcs of the panel and provide cooling to the fore liner panels of the combustor.

Alternatively, the bulkhead assembly can include a different cooling air design including the use of surface area enhancing ribs and pins. The entire panel or portions thereof can include no film or effusion cooling holes, with evacuation of the cooling air accommodated in part or entirely about the periphery of the panel.

Alternatively, the bulkhead panels can accommodate more than two fuel nozzles and guides at a fraction of the number of nozzle air guides.

Alternatively, the attachments or studs on the panels can be non-integral attachments.

Alternatively, the rails, in total or part, can be attached to support shell instead of integral to the panel.

An advantage of the present invention in practice and principle include, but are not limited to reducing part count for the combustor assembly to thereby reduce system complexity, weight and module cost. Another advantage is reduced panel discontinuities to thereby reduce cooling requirements.

Accordingly, the preceding portion of this specification is to be taken in an illustrative, as opposed to a limiting sense.

What is claimed is:

1. A section panel assembly for a bulkhead of a gas turbine combustor, comprising a section panel defining a rear or cold side and defining a front or hot side, the panel having a circumferential inner edge, a circumferential outer edge and radially extending first and second side edges each extending from the inner edge to the outer edge such that the inner and outer edges subtend a predetermined arc, the panel defining at least one opening extending from the rear side to the front side for receiving cooling air, the rear side including:
    a central lip extending about a periphery of the at least one opening;
    a circumferential rail spaced radially outwardly of and extending about the at least one opening for defining a cavity region including the at least one opening on the rear side of the section panel; and
    a peripheral rail spaced from each of the first and second side edges.

2. A section panel assembly as defined in claim 1, wherein the rear side of the section panel further includes an inner lip associated with the inner edge, and an outer lip associated with the outer edge.

3. A section panel assembly as defined in claim 2, wherein the front side of the section panel includes an inner lip associated with the inner edge, and an outer lip associated with the outer edge.

4. A section panel assembly as defined in claim 1, wherein the rear side of the section panel further includes a plurality of attachment studs disposed about a periphery of the section panel for coupling the section panel to a bulkhead support shell.

5. A section panel assembly for a bulkhead of a gas turbine combustor, comprising a section panel defining a rear or cold side and defining a front or hot side, the panel having a circumferential inner edge, a circumferential outer edge and radially extending first and second side edges each extending from the inner edge to the outer edge such that the inner and outer edges subtend a predetermined arc, the panel defining first and second openings spaced relative to one another along the arc and extending from the rear side to the front side for receiving cooling air, the rear side including:
    a first central lip extending about a periphery of the first opening;
    a second central lip extending about a periphery of the second opening;
    a first circumferential rail spaced radially outwardly of and extending about the first opening for defining a cavity region including the first opening on the rear side of the section panel; and
    a second circumferential rail spaced radially outwardly of and extending about the second opening for defining a cavity region including the second opening on the rear side of the section panel, wherein the rear side of the section panel further includes a peripheral rail spaced from each of the first and second side edges.

* * * * *